US008282126B2

(12) United States Patent
Wiik et al.

(10) Patent No.: US 8,282,126 B2
(45) Date of Patent: Oct. 9, 2012

(54) OCCUPANT RESTRAINT SYSTEM (75) Inventors: Richard Wiik, Fort Gratiot, MI (US);
Jonathan R. Kibat, Warren, MI (US);
Scott D. Thomas, Novi, MI (US);
Anthony Paul Clark, Victoria (AU)

(73) Assignees: TK Holdings Inc., Auburn Hills, MI (US); GM Global Technology Operations LLC, Detroit, MI (US)

( * ) Notice: Subject to any disclaimer, the term of this patent is extended or adjusted under 35 U.S.C. 154(b) by 33 days.

(21) Appl. No.: 12/903,971

(22) Filed: Oct. 13, 2010

(65) Prior Publication Data
US 2012/0091697 A1 Apr. 19, 2012

(51) Int. Cl.
*B60R 21/16* (2006.01)
(52) U.S. Cl. .................................... 280/730.2
(58) Field of Classification Search ............... 280/730.2, 280/730.1
See application file for complete search history.

(56) References Cited

U.S. PATENT DOCUMENTS

| | | | |
|---|---|---|---|
| 3,981,520 A * | 9/1976 | Pulling | 280/730.2 |
| 5,172,790 A * | 12/1992 | Ishikawa et al. | 180/268 |
| 6,010,149 A | 1/2000 | Riedel et al. | |
| 6,390,502 B1 | 5/2002 | Ryan et al. | |
| 6,505,853 B2 | 1/2003 | Brannon et al. | |
| 6,634,671 B2 | 10/2003 | Heigl et al. | |
| 6,695,347 B2 | 2/2004 | Sonnenberg et al. | |
| 6,966,576 B1 * | 11/2005 | Greenstein | 280/730.1 |
| 7,121,584 B2 | 10/2006 | Hasebe et al. | |
| 7,152,877 B2 | 12/2006 | Hasebe et al. | |
| 7,594,675 B2 * | 9/2009 | Bostrom et al. | 280/730.2 |
| 7,712,773 B2 | 5/2010 | Walston | |
| 7,766,374 B2 | 8/2010 | Abele et al. | |
| 2008/0061538 A1 * | 3/2008 | Mohammad et al. | 280/730.2 |
| 2008/0129024 A1 * | 6/2008 | Suzuki et al. | 280/734 |
| 2009/0001695 A1 * | 1/2009 | Suzuki et al. | 280/730.2 |
| 2010/0194083 A1 | 8/2010 | Sugimoto et al. | |
| 2010/0207363 A1 | 8/2010 | Fredriksson et al. | |
| 2011/0187087 A1 | 8/2011 | Kibat | |
| 2011/0278826 A1 * | 11/2011 | Fukawatase et al. | 280/730.2 |
| 2012/0038137 A1 | 2/2012 | Wipasuramonton et al. | |

FOREIGN PATENT DOCUMENTS

JP 2010052619 A * 3/2010

OTHER PUBLICATIONS

Office Action in U.S. Appl. No. 12/870,720 dated Mar. 26, 2012.

* cited by examiner

*Primary Examiner* — Faye M. Fleming
(74) *Attorney, Agent, or Firm* — Foley & Lardner LLP (57) ABSTRACT

An occupant restraint system for a motor vehicle having a seat system configured to provide seating to an occupant positioned adjacent to a console having a top surface and configured to provide utility; which includes a cushion stored in the folded configuration and having an inflatable chamber configured to inflate adjacent to an occupant to provide impact restraint to the occupant; an inflator configured to provide gas to inflate the inflatable chamber of the cushion; wherein a bottom portion of the cushion deploys to a position below the top surface of the console and a top portion of the cushion deploys to a position above the top surface of the console; wherein, during occupant loading, a portion of cushion contacts the console to receive lateral support and to react the forces imparted into the cushion induced by the occupant impacting the cushion, wherein the lateral support impedes lateral displacement of the cushion providing additional restraint to the occupant.

20 Claims, 7 Drawing Sheets

OCCUPANT RESTRAINT SYSTEM

BACKGROUND

The present application relates generally to the field of airbags for use within motor vehicles. More specifically, this application relates to side-impact airbags configured to deploy between the console of the vehicle and the seat system of the vehicle to provide improved restraint of a seated occupant by having the console react forces imparted onto the airbag cushion by the occupant.

SUMMARY

One embodiment of the invention relates to an occupant restraint system for a motor vehicle having a seat system configured to provide seating to an occupant positioned adjacent to a console having a top surface and configured to provide utility. The occupant restraint system includes a cushion, which is stored in the folded configuration, having an inflatable chamber configured to inflate adjacent to an occupant to provide impact restraint to the occupant; and an inflator configured to provide gas to inflate the inflatable chamber of the cushion. The cushion includes a bottom portion configured to deploy to a position below the top surface of the console, and a top portion configured to deploy to a position above the top surface of the console. During occupant loading of the cushion, a portion of the cushion contacts the console to receive lateral support and to react the forces imparted into the cushion induced by the occupant impacting the cushion, wherein the lateral support impedes lateral displacement of the cushion providing additional restraint to the occupant.

The bottom portion of the cushion that deploys to the position below the top surface of the console may include at least a portion of the inflatable chamber, wherein the inflatable chamber may include a lower portion having a downwardly narrowing tapered thickness during deployment. The occupant restraint system may further include a second inflatable chamber configured having a smaller inflatable volume relative to the inflatable volume of the first inflatable chamber of the cushion, wherein the second inflatable chamber reacts forces between the first inflatable chamber and the console during airbag deployment. The first and second inflatable chambers may be separated by a dividing layer of fabric, which prohibits fluid from moving directly between the two chambers.

The occupant restraint system may further include a positioning mechanism having a first end coupled to he cushion and a second anchored end, wherein the bottom portion of the cushion that deploys to the position below the top surface of the console includes at least a portion of the positioning mechanism. The bottom portion of the cushion that deploys to the position below the top surface of the console may include at least a portion of the inflatable chamber. The inflatable chamber may include a bottom surface configured to deploy to a position above the top surface of the console. During loading of the cushion, at least a portion of the positioning mechanism may contact the console to receive lateral support and to react the forces imparted into the cushion by the occupant impacting the cushion. The positioning mechanism configuration may be sail panel shaped, strap-shaped, tapered, or any suitable shape. The anchored end of the positioning mechanism may be coupled to a seat system, the console, a seatbelt system, a floor member of the vehicle, or any suitable member. The anchored end of the positioning mechanism may be fixed to prohibit the anchored end from displacing, or may be slideably coupled to allow the anchored end to displace, during airbag deployment. The positioning mechanism may include a selvage portion stiffened by having a plurality of layers of fabric coupled together. The positioning mechanism may route from one-side of the cushion to a different side of the cushion to decrease the effective length of the mechanism during airbag deployment. The positioning mechanism may route through a slit or slot in a non-inflated portion of the cushion. The anchored end of the positioning mechanism may be coupled to the cushion, such as to the selvage portion, an inflated portion, or a non-inflated portion.

The positioning mechanism may deploy through the exterior surface (i.e., the A-surface) of the seat system, as the positioning mechanism moves from a stored configuration to a deployed configuration. The exterior surface of the seat system may include a feature, such as a tear seam, a Velcro-shut opening, a snap-shut opening, or any suitable device. The positioning mechanism may deploy through the feature of the exterior surface of the seat system.

Another embodiment of the invention relates to an occupant restraint system for a motor vehicle having a seat system configured to provide seating to an occupant positioned adjacent to a console having a top surface and configured to provide utility. The occupant restraint system includes a cushion, which is stored in the folded configuration, having a top portion, a bottom portion and an inflatable chamber configured to inflate to provide side-impact restraint to the occupant; an inflator configured to provide gas to inflate the inflatable chamber of the cushion; and a positioning mechanism having a first end coupled to the cushion and a second anchored end. The bottom portion of the cushion includes at least a portion of the inflated chamber, such that the bottom portion of the cushion deploys to a position below the top surface of the console, and the top portion of the cushion deploys to a position above the top surface of the console. During occupant loading of the cushion, at least a portion of the contacts the console to receive lateral support and to react the forces imparted into the cushion induced by the occupant impacting the cushion, where in the lateral support impedes lateral displacement of the cushion providing additional restraint to the occupant.

Another embodiment of the invention relates to an occupant restraint system for a motor vehicle having a seat system configured to provide seating to an occupant positioned adjacent to a console having a top surface and configured to provide utility. The occupant restraint system includes a cushion, which is stored in the folded configuration, having a bottom portion, a top portion and an inflatable chamber configured to inflate to provide impact restraint to the occupant of the vehicle; and an inflator configured to provide gas to inflate the inflatable chamber of the cushion. The bottom portion of the cushion includes a positioning mechanism, wherein at least a portion of the positioning mechanism is configured to deploy to a position that is below the top surface of the console, and wherein the top surface of the cushion deploys to a position that is above the top surface of the console. During occupant loading of the cushion, at least a portion of the cushion contacts the console to receive lateral support and to react the forces imparted into the cushion induced by the occupant impacting the cushion, and wherein the lateral support impedes lateral displacement of the cushion providing additional restraint to the occupant.

DETAILED DESCRIPTION

Side-impact airbag systems are located in vehicles to help reduce occupant injury during a dynamic vehicle event, such as a side-impact or rollover event. A side-impact airbag system may include an inflatable airbag cushion that deploys during a dynamic vehicle event and inflates from gas which is rapidly pushed into the airbag cushion by means of an inflator. An inflator or module may use a device, such as a pyrotechnic device or other airbag inflation device, to generate gas almost instantaneously and to push the gas at a high volumetric flow rate into the inflatable airbag cushion of the airbag system. A side-impact airbag cushion or airbag may be stored within and deployed from a seat system (or assembly) of a vehicle, typically either the inside or outside facing surfaces of the seat-back, from a roof-rail, or from any other useful vehicle device. Side-impact airbags are typically packaged through a process of folding and rolling to compact the airbag in order for it to fit into the small cross-section of the storage area, such as the seat-back of a seat system. After installation, the airbag may be stored within the seat-back to provide improved interior vehicle appearance. Side-impact airbags may be used to provide restraint to occupants located in any seating row (e.g., first, second, third) of a vehicle and typically provide restraint to outboard occupants when deployed. A single side-impact airbag may be configured with multiple inflatable airbag portions or chambers to provide restraint to one or more than one occupant, which may be located in one or more different seating rows and/or positions.

Side impact airbags typically have been employed to restrain the near-side occupant (i.e., the occupant on the side of impact of the vehicle) during a dynamic impact event. For example, during an event where a second vehicle impacts the passenger side of the first vehicle, the occupant in the passenger seat of the first vehicle would be considered the near-side occupant. During such an event, an airbag may deploy between the near-side occupant (i.e., passenger) and the door panel of the vehicle to cushion the impact of the near-side occupant. The occupant instead of impacting the door panel or door-window, impacts the cushion, which absorbs the occupant loads by distributing them through the reacting member, the door assembly. This type of side-impact airbag (e.g., for restraining the near-side occupant) typically is configured with a relative low internal chamber pressure, such as 50 kPa to support the thorax or 100 kPa to support the pelvis of the occupant, which allows the airbag to absorb energy of the occupant by displacing the volume in the chamber. This type of side-impact airbag may be configured with a relative low internal chamber pressure because a substantial portion of the outboard surface (i.e., the surface facing the door assembly) of the cushion is supported by the door assembly, putting the cushion into compression and not bending.

The airbags disclosed herein may be configured to restrain and cushion the far-side occupant (i.e., the occupant on the side opposite of the impact to the vehicle) during a dynamic vehicle impact event. For example, during an event where a second vehicle impacts the passenger side of the first vehicle, the occupant in the driver side of the first vehicle would be considered the far-side occupant. During such an event, the force of impact from the second vehicle displaces the far-side occupant laterally or in an oblique direction, typically towards the near-side occupant. Most motor vehicles have a gap or void between the driver and passenger, and are not separated by a wall. Some motor vehicles are configured to include a member (e.g., center console) protruding from the floor of the vehicle between the driver and passenger, but typically this member is limited in height to approximately the pelvis or bottom of the elbow of the adjacent occupant. This vehicle configuration precludes the conventional side-impact airbag, which are configured to deploy between the near-side occupant and the door assembly to restrain the near-side occupant, from efficiently restraining and/or cushioning the far-side occupant. The airbags disclosed herein may provide direct restraint and/or cushioning to far-side occupants by limiting the lateral displacement of the far-side occupant, which provides indirect restraint (and possibly cushioning) to near-side occupants by preventing the far-side occupant from possibly impacting the near-side occupant during events triggering airbag deployment.

Figure 1:
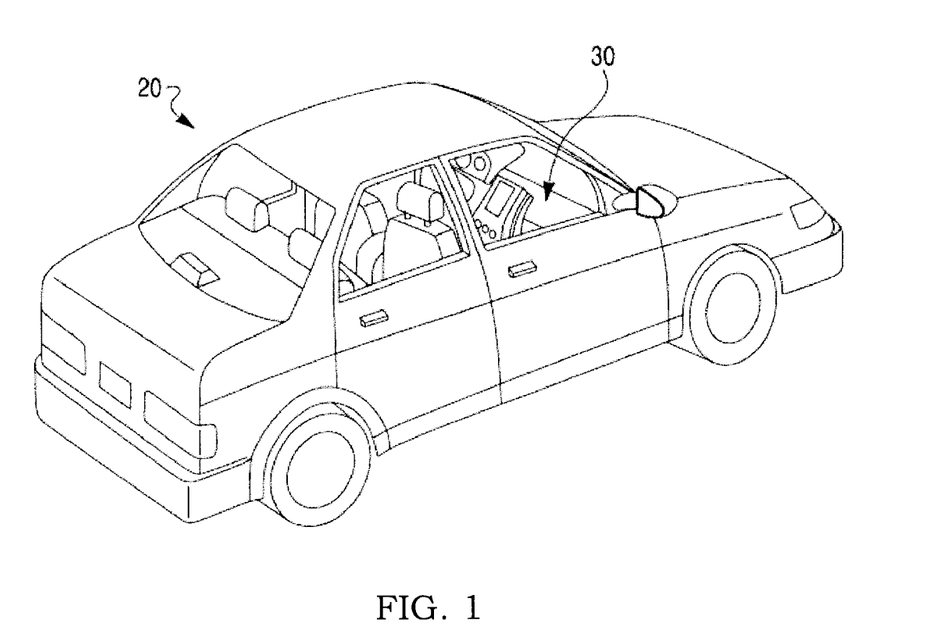
FIG. 1 is a perspective view of a motor vehicle, which includes an occupant restraint system.

With reference to FIG. 1, an exemplary embodiment of a motor vehicle 20 is illustrated and includes a passenger compartment 30. The passenger compartment includes at least one occupant restraint system or side-impact airbag system. The occupant restraint systems disclosed herein can be included within any passenger compartment (e.g., driver-side, passenger-side, rear passenger) and are not limited by the illustrations herein. An occupant restraint as disclosed herein may be configured to restrain and/or cushion any occupant of any vehicle.

With reference to FIGS. 2-5, a passenger compartment 30 is illustrated and includes a seat system (or assembly) 40 configured to provide seating to occupant 35 and a center console 33 to provide utility, such as storage volume. According to an exemplary embodiment, seat system 40 includes a seat-cushion 41, a seat-back 43 and an occupant restraint system (or airbag system) 50. The seat system 40 may further include an active occupant restraint system (e.g., seat belt system) 45. The occupant restraint system 50 may be stored in and deployed from the seat-back 43, the seat-cushion 41, or from anywhere on or in the seat system 40. According to other embodiments, the occupant restraint system 50 may be stored in and deployed from other vehicle components or may be stored in and deployed external to the seat system 40, such as from the center console of the vehicle.

Figure 2:
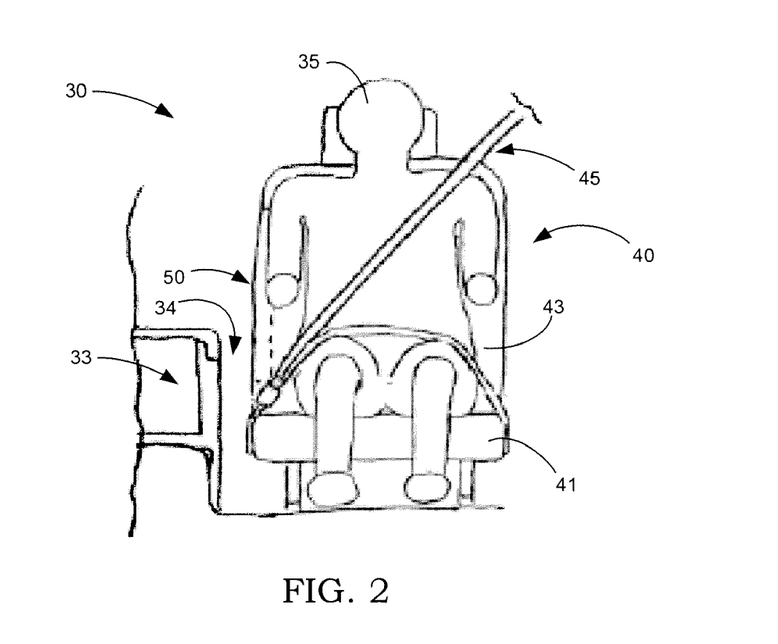
FIG. 2 is a front view of a partial passenger compartment of a motor vehicle.
Figure 3:
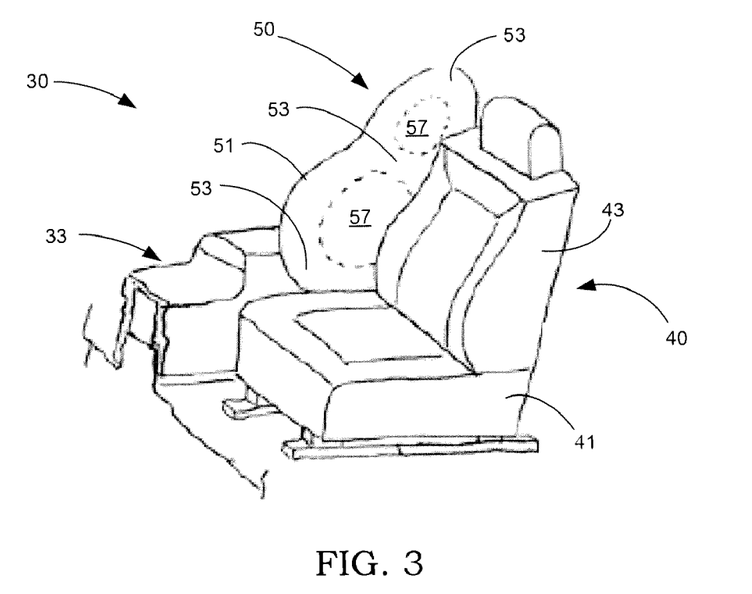
FIG. 3 is a perspective view of an exemplary embodiment of an occupant restraint system illustrated deployed or unfolded from the side of a seat system.
Figure 4:
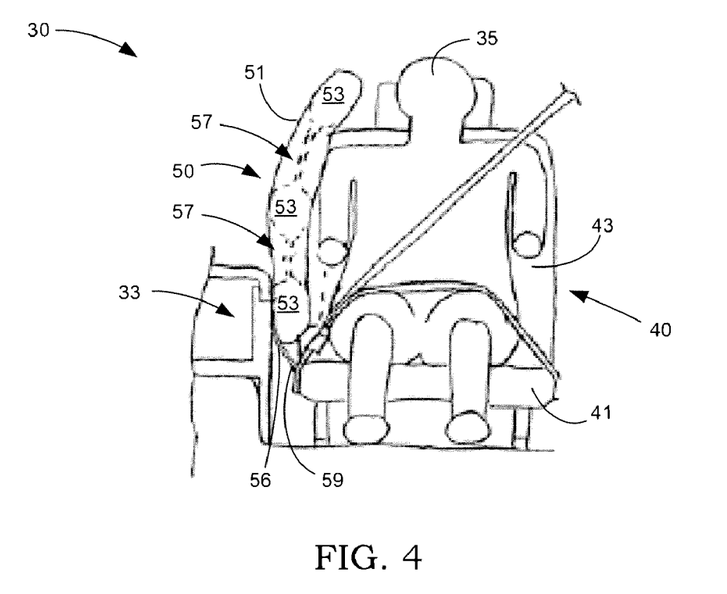
FIG. 4 is a front view of the occupant restraint system of FIG. 2 illustrated deployed or unfolded.

The console 33 may couple to the floor of the vehicle 20 and may be positioned adjacent to the seat system 40, such as adjacent to the seat-cushion 41. According to an exemplary embodiment, the console 33 extends from the floor to a height beyond the height of the seat-cushion 41, such as shown in FIG. 2. According to other exemplary embodiments, the console 33 may extend from the floor to a height substantially similar to or less than the height of the seat-cushion 41, such as to a height that approximates the location of the elbow of the occupant, since the console 33 may be used as an inboard armrest. The console may be configured to have any height. The console 33 may have a length in the fore-aft direction (i.e., longitudinal direction of the vehicle) that is longer, substantially similar to, or less than the length of the seat-cushion 41. The console 33 may have rectangular cross-sectional shape, such as shown in FIG. 3, or may have any other suitable cross-section that provides utility and further provides structural support to withstand the forces from the deploying occupant restraint system and occupant during an event triggering airbag deployment. The console 33 may further include cross-braces, support members, and/or bins having lids that may be lipped over or under to further increase the strength and bending resistance of the console. The console 33 may have a flat top surface or may have a stepped top surface having multiple portions at varying heights. The console 33 may further include adjustable armrest or bin positions.

According to an exemplary embodiment, the occupant restraint system 50 may include an airbag cushion 51 and an inflator (not shown). According to another exemplary embodiment, the occupant restraint system 50 may include an airbag cushion 51, a positioning mechanism 56, and an inflator (not shown). According to yet another exemplary embodiment, the positioning mechanism 56 may be configured as part of the airbag cushion 51. The airbag cushion 51 may include one or a plurality of woven fabric panels coupled together through conventional methods (e.g., stitching, adhesive, etc.) to form one or a plurality of inflatable chambers 53, which may be filled with inflation gas during airbag deployment.

The airbag cushion 51 may further include one or a plurality of non-inflatable portions 57. According to an exemplary embodiment, the airbag cushion 51 may include two non-inflatable portions 57 that form three interconnected inflatable portions of inflatable chamber 53, whereby the inflatable portions form a substantially B-shaped configuration, upon deployment, whereby the airbag cushion 51 may extend along a vehicle height from below the upper surface of the console 33 to a height capable of providing restraint to the head and neck of the occupant, such as to a height above the seat-back 43.

According to an exemplary embodiment, the console 33 may be separated from the seat system 40 by a gap 34, as shown in FIG. 2. The airbag cushion 51 of the occupant restraint system 50 may be advantageously configured and shaped to deploy into the gap 34 formed between the console 33 and the seat system 40. According to another exemplary embodiment, the positioning mechanism 56 may aid the airbag cushion 51 to deploy between the console 33 and the seat system 40 and/or the occupant 35.

According to an exemplary embodiment, a portion (e.g., lower portion) of the inflatable chamber 53 of the cushion 51 may be configured to deploy to a location adjacent to and contacting the center console 33 in order to receive lateral support and to react at least a portion of the forces imparted into the cushion by the occupant 35 impacting the cushion 51. The cushion 51 effectively has an increased stiffness by reacting the forces from the occupant 35 into the center console 33, where the increased stiffness reduces the displacement (e.g., lateral displacement) of the occupant. Thus, the lateral support provided to the inflatable chamber 53 by the console 33 impedes lateral displacement of the cushion 51 and provides additional restraint to the occupant 35.

According to an exemplary embodiment, the positioning mechanism 56 of the cushion may be configured to deploy to a location adjacent to the console 33 in order to aid deployment of the cushion and to provide tension on the cushion 51 to react the forces induced by the occupant 35 impacting the cushion. According to another exemplary embodiment, a portion of the positioning mechanism 56 may be configured to contact the console 33, during deployment and subsequent to occupant loading, in order to receive lateral support and to react the forces imparted into the cushion 51 by the occupant 35 impacting the cushion.

According to an exemplary embodiment, positioning mechanism 56 may be a relatively thin member, such as a strap, having a first end having an anchor location 59 and a second end, which may couple to the airbag cushion 51. The positioning mechanism 56 may have a substantially uniform or constant cross section or shape, or may have a varying shape, such as being narrower at the first end relative to the second end. The anchor location 59 may couple to the outside or inside of the seat system 40, such as the seat-cushion 41 (which is meant to include the associated structure or frame that provides the structural integrity to the seat), using any suitable method (e.g., stitching, fastener). The anchor location 59 may couple to a fixed position on seat system 40 or may slideably couple to seat system 40, whereby the anchor location 59 may slide in a direction, such as in a substantially fore-aft direction, to tailor airbag deployment. The second end of the positioning mechanism 56 may couple external to the airbag cushion, such as on the outside of the panel adjacent to the console 33 (and opposite to the panel adjacent to the occupant 35), or may couple internal to the airbag cushion to any panel, using any suitable method (e.g., stitching, fastener).

Figure 5:
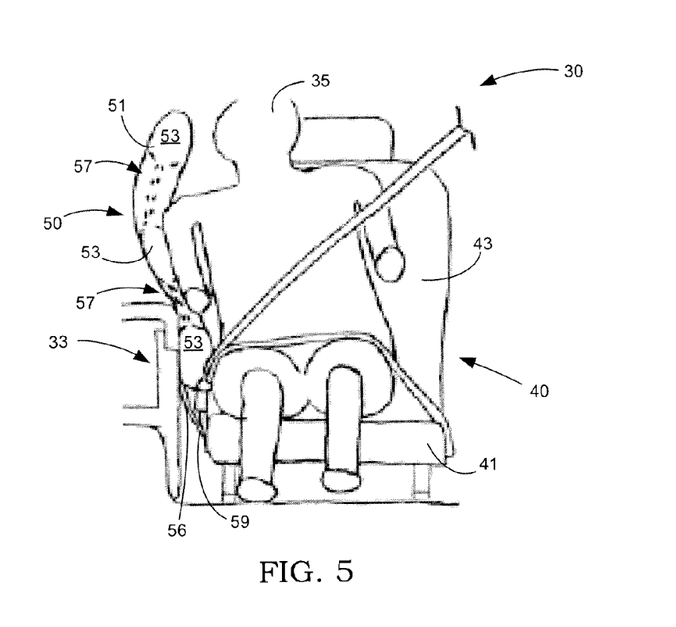
FIG. 5 is a front view of the occupant restraint system of FIG. 2 illustrated deployed (or unfolded) and restraining lateral displacement of the occupant.

During deployment of the airbag cushion, the positioning mechanism 56 may be subjected to tension that induces a portion of the airbag cushion, such as a lower inflatable portion of inflatable chamber 53, to deploy between the console and the occupant and/or the seat system 40, such as the seat-cushion 41. The positioning mechanism 56 may prohibit the airbag deployment from being delayed or the deployment trajectory from being altered due to contact with the console 33. The positioning mechanism 56 may tailor deployment of the airbag cushion, so that an inflatable portion of the airbag cushion is positioned between the occupant 35 and the console 33, to provide a reaction surface (i.e., the console 33) to react the forces imparted onto the airbag cushion 51 by the displacing occupant 35. Thus, both the inflated airbag cushion and the deployed positioning mechanism 56 may be positioned adjacent to the center console 33 during the lateral loading of the cushion by the occupant 35. By contacting this reaction surface of the console 33, which resists displacement from the lateral forces imparted by the occupant, the occupant restraint system 50 limits lateral displacement of the occupant and improves occupant restraint, as shown in FIG. 5, since the airbag cushion is supported along the rear of, as well as, along the bottom of the deploying airbag. Without this reaction surface from the console, the airbag cushion may act like a cantilever beam, supported only by the seat-back of the seat system (i.e., along the rear of the deploying airbag), where upon impact from the occupant, the airbag cushion may displace a greater distance laterally, providing less occupant restraint.

Figure 10:
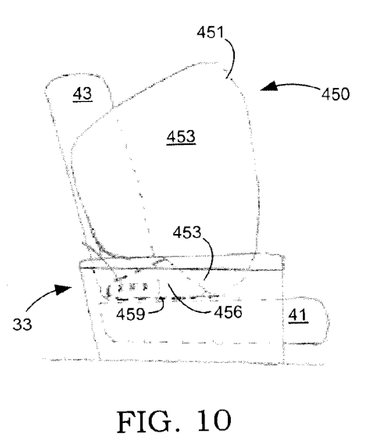
FIG. 10 is a side view of another exemplary embodiment of an occupant restraint system illustrated deployed or unfolded from the side of a seat system.
Figure 11:
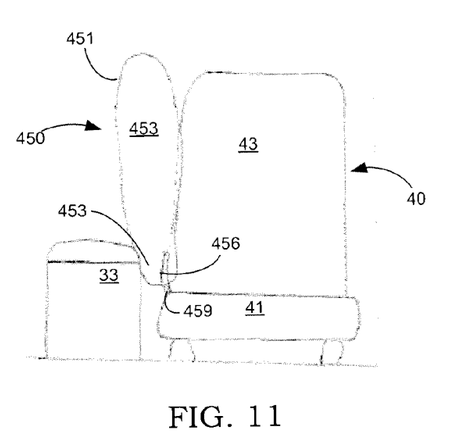
FIG. 11 is a front view of the occupant restraint system of FIG. 10 illustrated deployed or unfolded.

According to another exemplary embodiment, the occupant restraint system 450 may include an airbag cushion 451 and a positioning mechanism 456, as shown in FIGS. 10 and 11. According to another exemplary embodiment, the positioning mechanism 456 may be configured as part of the airbag cushion 451. The airbag cushion 451 may include a plurality of woven fabric panels coupled together through conventional methods to form an inflatable chamber 453, which may be filled with inflation gas during airbag deployment. Upon deployment and inflation of the cushion, the inflatable chamber 453 may form a substantially D-shaped configuration, which may extend along a vehicle height from below the upper surface of the console 33 to a height capable of providing restraint to the head and neck of the occupant, such as to a height above the seat-back 43.

According to an exemplary embodiment, the positioning mechanism 456 may form a sail shape (i.e., substantially triangular shaped), upon deployment, having a lower edge serving as an anchor location 459 coupled to another component, such as the seat-cushion 41 of the seat system 40. One or both of the two remaining edges of the sail shaped positioning mechanism 456 may couple to the lower portion of the airbag cushion 451. The sail shaped positioning mechanism 456 may couple to a panel facing the occupant or to a panel facing the console 33 of the airbag cushion 451. The sail shaped positioning mechanism 456 may tailor the deployment of airbag cushion 451 by having tension, which induces the lower portion of the airbag cushion 451 to deploy between the console 33 and the occupant and/or the seat system 40 to provide a reaction surface (i.e., the console 33) that reacts the forces imparted onto the airbag cushion 51 by the displacing occupant 35. The positioning mechanism 456 may also prohibit the airbag deployment from being delayed or the deployment trajectory from being altered due to contact with the console 33.

Figure 6:
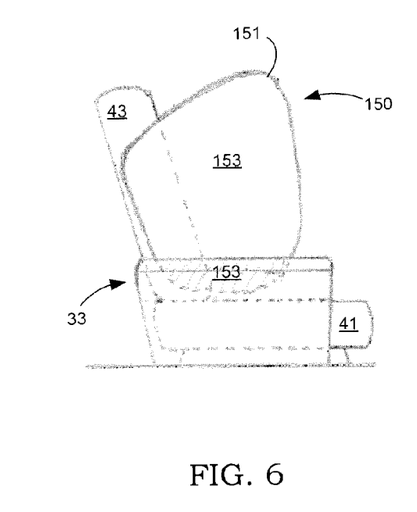
FIG. 6 is a side view of another exemplary embodiment of an occupant restraint system illustrated deployed or unfolded from the side of a seat system.
Figure 7:
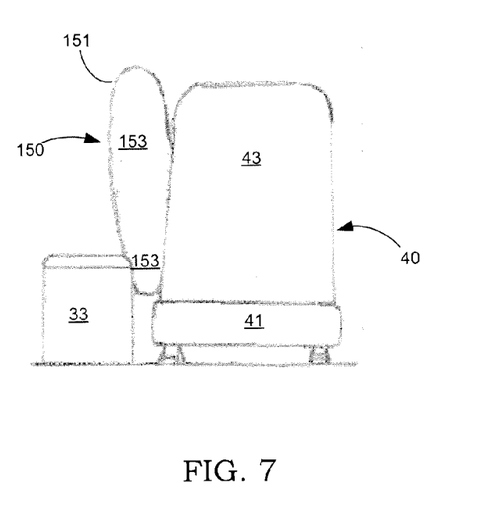
FIG. 7 is a front view of the occupant restraint system of FIG. 6 illustrated deployed or unfolded.

With reference to FIGS. 6 and 7, according to another exemplary embodiment, an occupant restraint system 150 includes an airbag cushion 151 and an inflator (not shown). The airbag cushion 151 may include one or a plurality of woven fabric panels coupled together through conventional methods (e.g., stitching) to form one or a plurality of inflatable chambers 153, which may be filled with inflation gas during airbag deployment. The airbag cushion 151 may include an inflatable chamber 153 that forms a substantially D-shaped configuration upon inflation and deployment from the seat system 40, such as the seat-back 43.

According to an exemplary embodiment, the airbag cushion 151 may taper in cross-car width or thickness from the substantially mid-height portion of the cushion down towards the bottom of the inflatable chamber 153 to aid airbag deployment to position the bottom of the inflatable chamber 153 between the console 33 and the seat system 40 or occupant. Thus, the bottom portion of the inflatable chamber 153 may be narrower than the mid-portion of the inflatable chamber 153 of airbag cushion 151. Further, the bottom portion of the inflatable chamber 153 may include a substantially flat seam or portion, which acts as the downwardly leading edge of the deploying airbag. The airbag cushion 151 may further include one or a plurality of non-inflatable portions.

Figure 8:
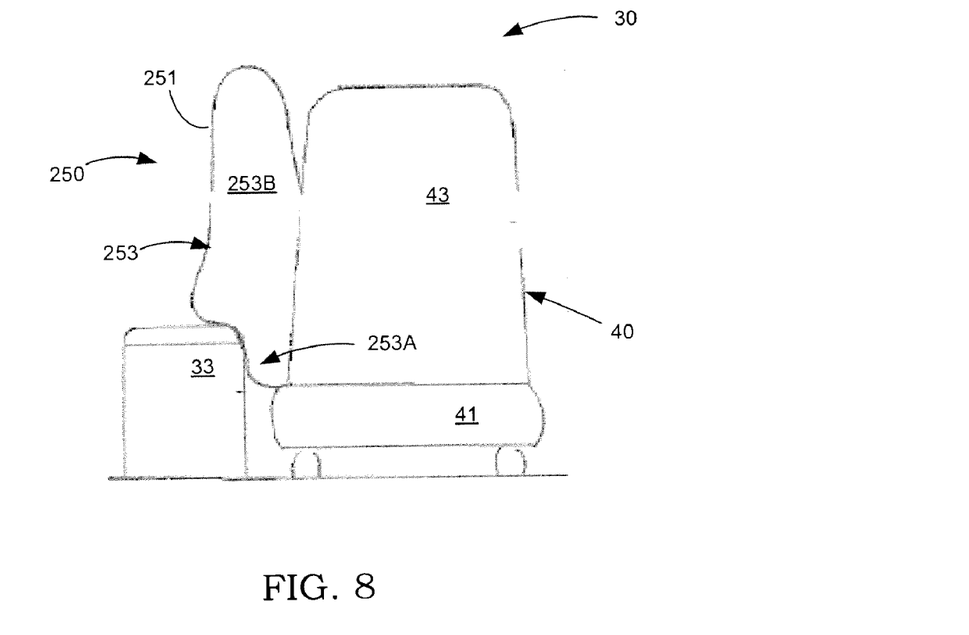
FIG. 8 is a front view of another exemplary embodiment of an occupant restraint system.

With reference to FIG. 8, another exemplary embodiment of an occupant restraint system 150 is shown to include an airbag cushion 251. The airbag cushion 251 may include one or a plurality of woven fabric panels coupled together through conventional methods (e.g., stitching) to form one or a plurality of inflatable chambers 253, which may be filled with inflation gas during airbag deployment. The airbag cushion 251 may include an inflatable chamber 253 that forms a substantially D-shaped configuration upon deployment from the seat system 40, such as the seat-back 43.

According to an exemplary embodiment, the airbag cushion 251 may have a varying cross-car width or thickness. The airbag cushion 251 may include a bottom portion 253A of the inflatable chamber 253 having a cross-car width less than the cross-car width of the upper and/or center portion 253B of the inflatable chamber 253. This enables the bottom portion 253A of the inflatable chamber 253 to deploy laterally adjacent to the center console 33 and the upper portion 253B of the inflatable chamber 253 to deploy above and/or abutting the top of the center console 33. The inflatable chamber 253 may form a deployed profile substantially similar to the profile of the console 33 with the chamber 253 abutting the console 33 to improve the transfer of loads. Thus, the entire bottom portion 253A of the inflatable chamber 253 may be narrower than the upper and/or center portion 253B of the inflatable chamber 253 of airbag cushion 251. The cross-car width of the bottom portion 253A of the inflatable chamber 253 may be tailored to the varying widths between the console 33 and the seat system 40 for different vehicles. The upper portion 253B may also be configured to wrap around or over the top of the console 33 in order for loads to be transmitted into the top of the console, such as, for example, if the occupant rotates into the cushion causing the cushion to rotate during loading.

Figure 9:
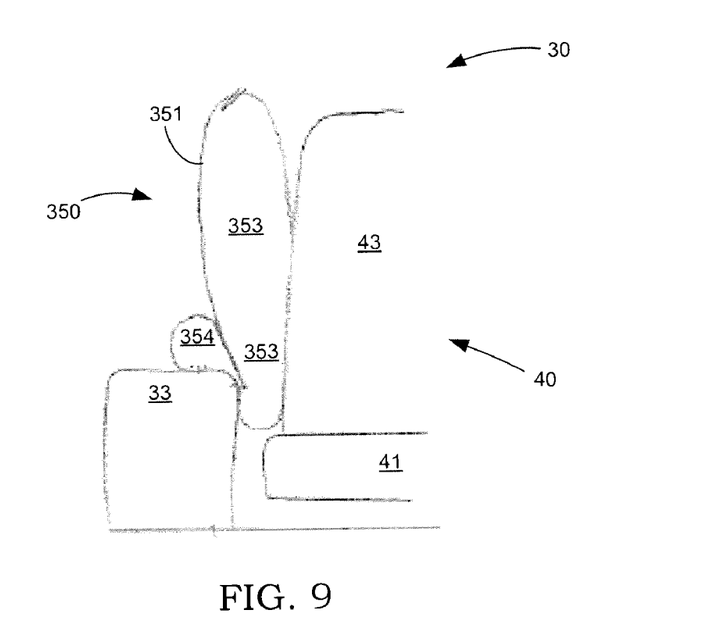
FIG. 9 is a front view of another exemplary embodiment of an occupant restraint system.

With reference to FIG. 9, another exemplary embodiment of an occupant restraint system 350 is shown to include an airbag cushion 351 and an inflator (not shown). The airbag cushion 351 include a plurality of woven fabric panels coupled together through conventional methods (e.g., stitching) to form a first inflatable chamber 353 and a second inflatable chamber 354, which may be filled with inflation gas, during airbag deployment, from the same or separate inflators.

Upon deployment from the seat system 40, the first inflatable chamber 353 may form a substantially D-shaped configuration that deploys to a location adjacent to the console 33 to a height capable of providing restraint to the head and neck of the occupant, such as to a height above the seat-back 43. The first inflatable chamber 353 may deploy to a location that is adjacent to and overlapping the console 33.

Upon deployment from the seat system 40, the second inflatable chamber 354 may form a substantially circular cross-section and tubular shaped configuration that deploys adjacent to the first inflatable chamber 353 on the side facing the console 33 (and opposite to the side facing the occupant). The second inflatable chamber 354 may have a substantially smaller volume relative to the first inflatable chamber 353. The second inflatable chamber 354 may act to extend the reaction surface (e.g., reaction surface of the console 33) against the first inflatable chamber 353 in an upwardly direction, to further resist lateral displacement and lateral forces by the occupant, further improving occupant restraint. The second inflatable chamber 354 may act like a wedge between the console 33 and the first inflatable chamber 353 to provide more structural support than the console 33 alone. The occupant restraint system 350 may include a second inflator (not shown) to provide inflation gas directly to the second inflatable chamber 354.

With reference to FIGS. 12-16, exemplary embodiments of occupant restraint systems are shown deployed to provide restraint to an occupant (removed for clarity). The passenger compartment 30 includes a seat system 40 configured to provide seating to an occupant and a center console 33 to provide utility, such as storage volume. According to an exemplary embodiment, seat system 40 includes a seat-cushion 41, a seat-back 43 and an occupant restraint system (or airbag system) 550. The occupant restraint system 50 may be stored in and deployed from the seat-back 43, the seat-cushion 41, or from anywhere on or in the seat system 40.

Figure 12:
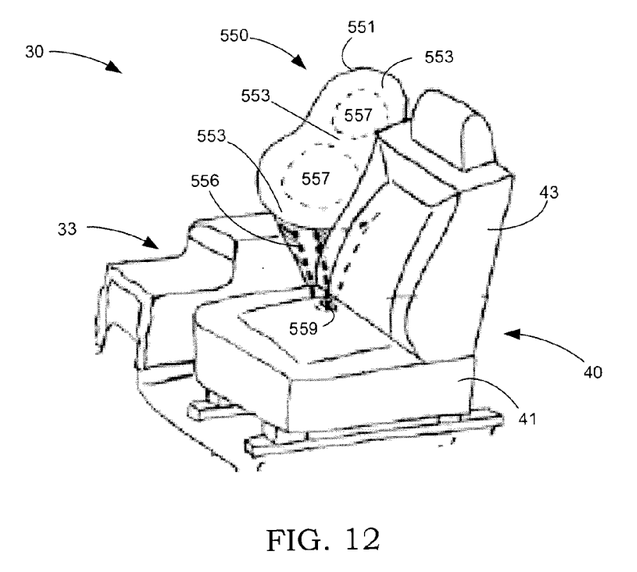
FIG. 12 is a perspective view of another exemplary embodiment of an occupant restraint system illustrated deployed or unfolded from the side of a seat system.

According to the exemplary embodiment shown in FIG. 12, the occupant restraint system 550 includes an airbag cushion 551, a positioning mechanism 556, and an inflator (not shown). The airbag cushion 551 may include one or a plurality of woven fabric panels coupled together through conventional methods (e.g., stitching) to form one or a plurality of inflatable chambers 553, which may be filled with inflation gas during airbag deployment. The airbag cushion 551 may further include one or a plurality of non-inflatable portions 557. According to an exemplary embodiment, the airbag cushion 551 includes two non-inflatable portions 557 that form three interconnected inflatable portions of the inflatable chamber 553, whereby the inflatable portions form a substantially B-shaped configuration, upon deployment.

According to an exemplary embodiment, the inflatable chamber 553 of the airbag cushion 551 may deploy above the console 33, while the positioning mechanism 556 may deploy below the inflatable chamber 553 and adjacent to the console 33. The inflatable chamber 353 may include a bottom surface configured to deploy to a position (or location) that is above the top surface of the console 33. During deployment, at least a portion of the positioning mechanism 556 is configured to contact the console 33 to receive lateral support and to further react the forces imparted into the cushion by the occupant impacting the cushion. Thus, the positioning mechanism provides tension on the cushion to react the forces imparted by the impacting occupant.

Figure 13:
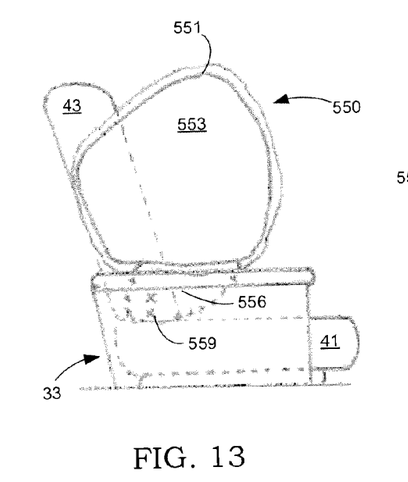
FIG. 13 is a side view of another exemplary embodiment of an occupant restraint system illustrated deployed or unfolded from the side of a seat system.
Figure 14:
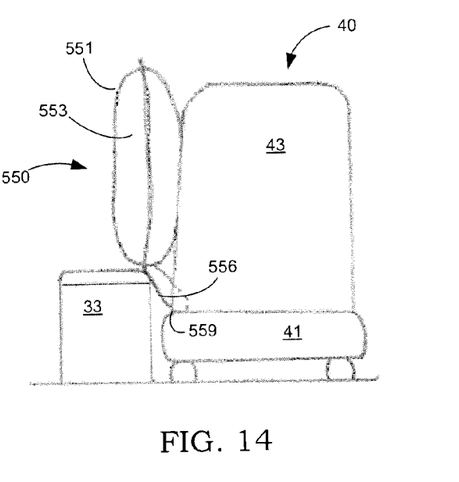
FIG. 14 is a front view of the occupant restraint system of FIG. 13 illustrated deployed or unfolded.

According to another exemplary embodiment shown in FIGS. 13 and 14, the cushion is D-shaped without non-inflatable regions and with the lower surface of the lower portion of the inflatable chamber 553 above the top surface of the adjacent portion of the console 33. According to another exemplary embodiment shown in FIGS. 15 and 16, the cushion is D-shaped with one non-inflatable region and with the lower surface of the lower portion of the inflatable chamber 653 above the top surface of the adjacent portion of the console 33.

Also with reference to FIGS. 12-16, the positioning mechanism may couple on a first end to the airbag cushion and on a second anchored end to the seat system 40, such as the seat back 43 or seat cushion 41. According to the exemplary embodiments in FIGS. 12-14, the positioning mechanism 556 may form a sail-shaped configuration (i.e., roughly triangular in shape), having an upper edge to couple to the lower edge of the inflatable chamber 553 of the airbag cushion 551 and having a lower anchor location 559 to couple to the seat back 43 of seat system 40. The sail-shaped positioning mechanism 556 may provide a couple to the airbag cushion 551 that extends along a substantial length of the lower edge of the airbag cushion 551 to provide improved support to reduce the lateral displacement of the airbag cushion when loaded by an occupant. The airbag cushion 551 may couple to and deploy from the seat back 43, so by having a sail-shaped positioning mechanism 556, both the rearward and lower edges of the airbag cushion 551 may be supported to resist displacement, such as lateral displacement induced by contact from an occupant impacting the airbag cushion. Thus, the occupant restraint system 550 having a sail-shaped positioning mechanism may provide improved occupant restraint by reducing the lateral displacement of the cushion and occupant, due to an increased profile that resists lateral displacement.

Figure 15:
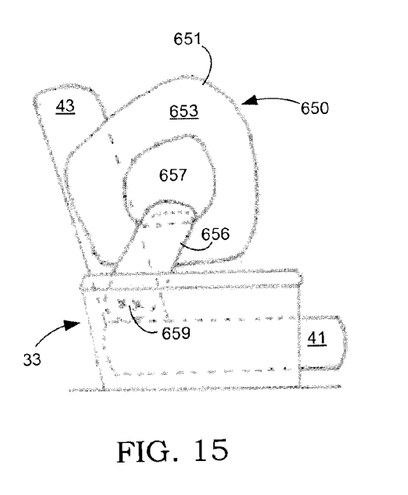
FIG. 15 is a side view of another exemplary embodiment of an occupant restraint system illustrated deployed or unfolded from the side of a seat system.
Figure 16:
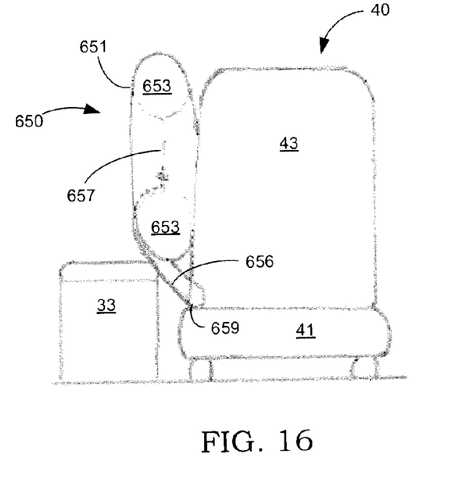
FIG. 16 is a front view of the occupant restraint system of FIG. 15 illustrated deployed or unfolded.

According to the exemplary embodiment shown in FIGS. 15 and 16, the positioning mechanism 656 may form a strap or panel-shaped configuration, which may have a substantially uniform or constant cross-section or shape. According to other exemplary embodiment, the positioning mechanism may taper on one or both ends, or may have a varying cross-section or shape.

The positioning mechanism 656 includes a first end to couple to a non-inflatable portion 657, which may be located within the inflatable chamber 653 of airbag cushion 651, such that a portion of the positioning mechanism 656 may wrap around a section of the lower portion of the inflatable chamber 653 during deployment, such as shown in FIGS. 15 and 16. The strap-shaped positioning mechanism 656 may wrap around the outboard panel (i.e., the panel facing the console) to allow for contact between console 33 and the positioning mechanism 656 with little or no lateral displacement of the airbag cushion. Since, the positioning mechanism 656 may be in tension and may react against the console for support with little or no lateral displacement of the cushion, this provides for improved occupant restraint by reducing occupant deflection by resisting the lateral forces and lateral displacement of the occupant with reduced lateral displacement of the cushion. The positioning mechanism 656 may further include an anchor location 659 for coupling to the seat system 40, such as the seat back 43, which allows the strap-shaped positioning mechanism 656 to be in tension during airbag deployment. It should be noted that the positioning mechanism may couple to the inboard or outboard sides of the airbag cushion and may be configured to couple to any portion (e.g., front edge, center, top edge) of the airbag cushion, and the illustrations herein are not meant as limitations. In this manner, the positioning mechanism may be configured as part of the cushion or an extension of the cushion.

During airbag deployment, the positioning mechanisms 556, 656 may be subjected to tension and may deploy adjacent to and/or abutting the console 33, so that the console 33 provides a reaction surface to react the forces imparted into the positioning mechanisms 556, 656. The console 33 may react forces from the positioning mechanism 556, 656 wrapping around the console due to the cushion 551 being moved in the inboard direction by forces induced by contact between the occupant and the airbag cushion. Thus, the impact of the occupant into the airbag cushion imparts lateral forces into the cushion that are reacted by forced from both the coupled location between airbag module and seat system, as well as the positioning mechanism 556, 656 and the console 33.

With reference to FIGS. 17-20, various other embodiments illustrating occupant restraint systems 750, 850, 950, 1050 are shown to include varying configurations of positioning mechanisms 761, 861, 961, 1061. The occupant restraint systems 750, 850, 950, 1050 further include airbag cushions 751, 851, 951, 1051 having at least one inflatable chamber 753, 853, 953, 1053. The airbag cushion may include one or more than one non-inflatable portions 757, 857, 957, 1057, which may be located anywhere on the airbag cushion. The positioning mechanisms 761, 861, 961, 1061 include a first end 762, 862, 962, 1062 to couple to the airbag cushion 751 and a second end 763, 863, 963, 1063 to couple to another vehicle component, such as the seat cushion 41 of seat system 40. It should be noted that the terms "seat cushion" and "seatback" when used herein are meant to include the structure or frame associated with that portion of the seat that provide the structural integrity, as well as include the trim and all components that a typical seat includes. The terms "seatcushion" and "seatback" are not meant to be limited to the foam that provides comfort to the seated occupant.

Figure 17:
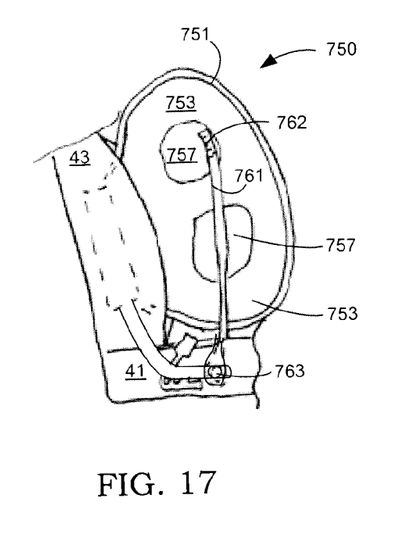
FIG. 17 is a side view of another exemplary embodiment of an occupant restraint system illustrated deployed or unfolded from the side of a seat system.

According to the exemplary embodiment shown in FIG. 17, the first end 762 couples to a portion of the non-inflatable portion 757 of the airbag cushion 751 through any suitable method (e.g., stitching, adhesive, etc.). According to the exemplary embodiment shown in FIG. 18, the first end 762 couples to a portion of the inflatable chamber 853 of the airbag cushion 851 through any suitable method. According to the exemplary embodiment shown in FIG. 19, the first end 962 couples to a portion of the selvedge edge of the airbag cushion 951. According to other exemplary embodiments, the first end of the positioning mechanism may couple to the cushion at any location using any suitable method.

Figure 20:
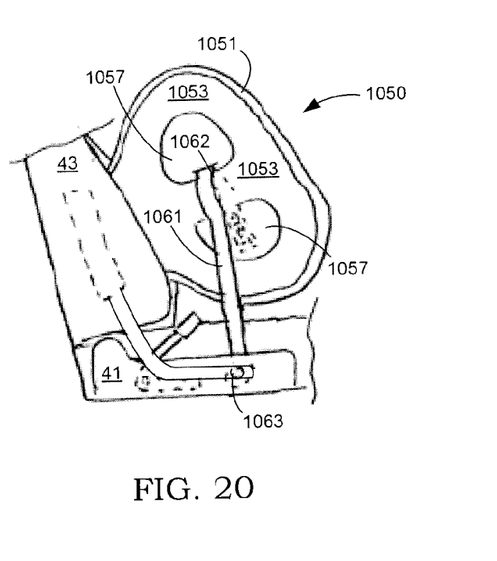
FIG. 20 is a side view of yet another exemplary embodiment of an occupant restraint system illustrated deployed or unfolded from the side of a seat system.

As shown in FIG. 20, the first end 1062 of the positioning mechanism 1061 may route along the external-facing surface of the panel of the airbag cushion and pass through a slit in one portion, such as the non-inflatable portion 1057, and may couple to the internal-facing surface of the panel. The positioning mechanism 1061 will decrease in effective length as the cushion inflates and expands. This configuration offers several advantages, some of which are discussed herein. First, this configuration enables a longer positioning mechanism in the folded (or non-inflated) state for initial routing to the attachment location at the second end 1063. Second, this configuration provides increased tensioning and cushion location control when the cushion is deployed or inflated. It should be noted that the tensioning mechanism may route having different configurations, such as over the top of the cushion or being woven through multiple non-inflated regions, to achieve the same or similar tensioning during inflation or deployment of the cushion. Thus, the embodiments illustrated herein should not be considered as limitations.

Also with reference to FIGS. 17-20, the occupant restraint systems 750, 850, 950, 1050 when in the stored or undeployed configurations, the positioning mechanisms 761, 861, 961, 1061 are routed from the first end of the positioning mechanism that couples to the cushion to the second anchored end, which may be inboard or under the seat (e.g., back or cushion) trim. According to an exemplary embodiment, the seat system is configured with a continuous tear seam, such as in the seat back, through which the cushion deploys and allows the positioning mechanism to move from under the seat back trim during deployment. According to another exemplary embodiment, the seat system is configured with a partial tear seam having an opening mechanism, such as a Velcro or snap-fit feature, that is configured to open at low forces to initiate the propagation of the tear along the tear seam to allow for the positioning mechanism to release from the seat system, upon deployment of the cushion. According to the exemplary embodiment shown in FIG. 19, the positioning mechanism 961 deploys from under a panel on the side of the seat, such as from under a wrap-around seatback panel. This configuration may include a tear seam.

Figure 18:
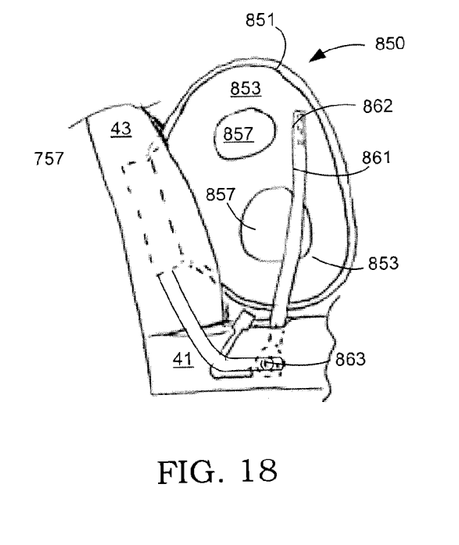
FIG. 18 is a side view of another exemplary embodiment of an occupant restraint system illustrated deployed or unfolded from the side of a seat system.
Figure 19:
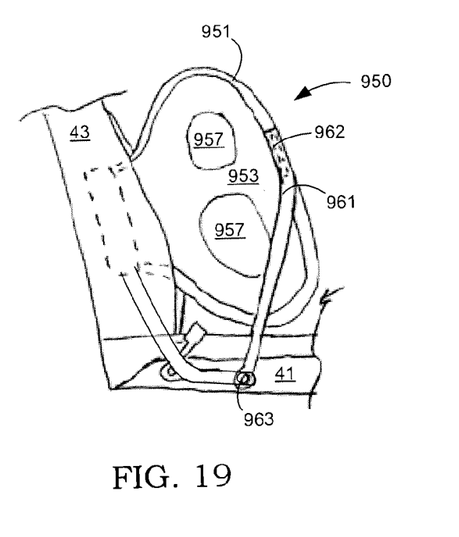
FIG. 19 is a side view of another exemplary embodiment of an occupant restraint system illustrated deployed or unfolded from the side of a seat system.

The positioning mechanism 761, 861, 961, 1061 may route inboard of the seat cushion trim, so that the positioning mechanism is not captured inside the seat trim. For example, the positioning mechanism may route inboard of both the seat trim and the seatbelt assembly (or seatbelt buckle), so that the cushion deploys inboard of the buckled seatbelt. As shown in FIGS. 18 and 20, the positioning mechanisms 861, 1061 may route inboard of the seat belt buckle assembly and outboard of the trim panel. The lower seat trim panel may tear at the tear seam or closeout panel could open at the top to release the positioning mechanism. It should be noted, that although not illustrated, the positioning mechanism shown in FIGS. 17-20 may be configured to locate the cushion, during deployment, adjacent to and/or above the center console (although not shown for clarity).

During airbag deployment, the positioning mechanism may be subjected to tension and may contact the console of the vehicle to react the forces imparted into the positioning mechanism by the cushion moving inboard from the force of the occupant contacting the inflated cushion. The positioning mechanism and/or the inflated cushion may wrap around a portion of the console to react the forces from the occupant. The reaction of the forces into the console reduces lateral displacement of the positioning mechanism and the airbag cushion, as well as the occupant loading into the airbag cushion.

According to another exemplary embodiment, the positioning mechanism is configured to include a feature (not shown), such as a loop, an eyelet, or a ring, whereby the loop feature is configured to surround at least a portion of the of the airbag cushion to couple the positioning mechanism to the cushion. The loop feature may be configured to terminate with an attachment to the positioning mechanism so that the loop feature is self-contained and self-attached within the positioning mechanism. The loop feature may also be coupled to another portion of the cushion. The loop feature may be configured to provide the similar function to any embodiment herein, such as provide tension during deployment to restrain the airbag and occupant.

It should be noted that any embodiment herein disclosed of an occupant restraint system that is configured to include a positioning mechanism may be configured as described without including the positioning mechanism, and any occupant restraint system that is configured without a positioning mechanism may be configured as described to include a positioning mechanism. Furthermore, any embodiment disclosed herein having a positioning mechanism may be configured to have both the inflated portion of the cushion and the positioning mechanism overlap the console, or may be configured with either the positioning mechanism or cushion overlapping the console. As an alternative embodiment, the positioning mechanism may be configured to include an inflatable portion, which may be in fluid communication with or fluidly isolated from the inflatable chamber of the cushion.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or movable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An occupant restraint system for a motor vehicle having a seat system configured to provide seating to an occupant positioned adjacent to a console having a top surface and configured to provide utility, the restraint system comprising:
   a cushion stored in the folded configuration;
   wherein the cushion includes an inflatable chamber, which is configured to inflate adjacent to an occupant to provide impact restraint to the occupant; and
   an inflator configured to provide gas to inflate the inflatable chamber of the cushion;
   wherein a bottom portion of the cushion deploys to a position below the top surface of the console, and a top portion of the cushion deploys to a position above the top surface of the console;
   wherein, during occupant loading of the cushion, a portion of the cushion contacts the console to receive lateral support and to react the forces imparted into the cushion induced by the occupant impacting the cushion; and
   wherein such lateral support impedes lateral displacement of the cushion providing additional restraint to the occupant.

2. The restraint system of claim 1, wherein the bottom portion of the cushion that deploys to the position below the top surface of the console includes at least a portion of the inflatable chamber.

3. The restraint system of claim 1, wherein the inflatable chamber includes a lower portion having a downwardly narrowing tapered thickness during deployment.

4. An occupant restraint system for a motor vehicle having a seat system configured to provide seating to an occupant positioned adjacent to a console having a top surface and configured to provide utility, the restraint system comprising:
   a cushion stored in the folded configuration;
   wherein the cushion includes an inflatable chamber, which is configured to inflate adjacent to an occupant to provide impact restraint to the occupant;
   an inflator configured to provide gas to inflate the inflatable chamber of the cushion;
   wherein a bottom portion of the cushion deploys to a position below the top surface of the console, and a top portion of the cushion deploys to a position above the top surface of the console;
   wherein, during occupant loading of the cushion, a portion of the cushion contacts the console to receive lateral support and to react the forces imparted into the cushion induced by the occupant impacting the cushion;
   wherein such lateral support impedes lateral displacement of the cushion providing additional restraint to the occupant; and
   a second inflatable chamber configured having a smaller inflatable volume relative to the inflatable volume of the first inflatable chamber of the cushion, wherein the second inflatable chamber reacts forces between the first inflatable chamber and the console during airbag deployment.

5. The restraint system of claim 4, wherein the first and second inflatable chambers are separated by a dividing layer of fabric, which prohibits fluid from moving directly between the two chambers.

6. An occupant restraint system for a motor vehicle having a seat system configured to provide seating to an occupant positioned adjacent to a console having a top surface and configured to provide utility, the restraint system comprising:
   a cushion stored in the folded configuration;
   wherein the cushion includes an inflatable chamber, which is configured to inflate adjacent to an occupant to provide impact restraint to the occupant;
   an inflator configured to provide gas to inflate the inflatable chamber of the cushion;
   wherein a bottom portion of the cushion deploys to a position below the top surface of the console, and a top portion of the cushion deploys to a position above the top surface of the console;
   wherein, during occupant loading of the cushion, a portion of the cushion contacts the console to receive lateral support and to react the forces imparted into the cushion induced by the occupant impacting the cushion;
   wherein such lateral support impedes lateral displacement of the cushion providing additional restraint to the occupant; and
   a positioning mechanism having a first end coupled to the cushion and a second anchored end, wherein the bottom portion of the cushion that deploys to the position below the top surface of the console includes at least a portion of the positioning mechanism.

7. The restraint system of claim 6, wherein the bottom portion of the cushion that deploys to the position below the top surface of the console includes at least a portion of the inflatable chamber.

8. The restraint system of claim 6, wherein the inflatable chamber includes a bottom surface configured to deploy to a position above the top surface of the console.

9. The restraint system of claim 6, wherein during occupant loading of the cushion, at least a portion of the positioning mechanism contacts the console to receive lateral support and to react the forces imparted into the cushion by the occupant impacting the cushion.

10. The restraint system of claim 6, wherein the positioning mechanism configuration is selected from the group consisting of sail-panel shaped, strap-shaped, and tapered.

11. The restraint system of claim 6, wherein the anchored end of the positioning mechanism is coupled to a device that is selected from the group consisting of seat system, the console, a seatbelt system, and a floor member of the vehicle.

12. The restraint system of claim 6, wherein the anchored end of the positioning mechanism is slideably coupled to allow the anchored end to displace during airbag deployment.

13. The restraint system of claim 6, wherein the positioning mechanism includes a selvage portion stiffened by having a plurality of layers of fabric coupled together.

14. The restraint system of claim 6, wherein the positioning mechanism routes from one side of the cushion to a different side of the cushion to decrease the effective length of the mechanism during airbag deployment.

15. The restraint system of claim 6, wherein the positioning mechanism routes through a slot in a non-inflated portion of the cushion.

16. The restraint system of claim 6, wherein the anchored end of the positioning mechanism is coupled to at least a portion of the cushion, wherein the portion is selected from the group consisting of a selvage portion, an inflated portion, and a non-inflated portion.

17. The restraint system of claim 6, wherein the positioning mechanism deploys through the exterior surface of the seat system, as the positioning mechanism moves from a stored configuration to a deployed configuration.

18. An occupant restraint system for a motor vehicle having a seat system configured to provide seating to an occupant positioned adjacent to a console having a top surface and configured to provide utility, the restraint system comprising:
    a cushion stored in the folded configuration;
    wherein the cushion includes an inflatable chamber, which is configured to inflate adjacent to an occupant to provide impact restraint to the occupant;
    an inflator configured to provide gas to inflate the inflatable chamber of the cushion;
    wherein a bottom portion of the cushion deploys to a position below the top surface of the console, and a top portion of the cushion deploys to a position above the top surface of the console;
    wherein, during occupant loading of the cushion, a portion of the cushion contacts the console to receive lateral support and to react the forces imparted into the cushion induced by the occupant impacting the cushion;
    wherein such lateral support impedes lateral displacement of the cushion providing additional restraint to the occupant;
    a positioning mechanism having a first end coupled to the cushion and a second anchored end, wherein the bottom portion of the cushion that deploys to the position below the top surface of the console includes at least a portion of the positioning mechanism;
    wherein the positioning mechanism deploys through the exterior surface of the seat system, as the positioning mechanism moves from a stored configuration to a deployed configuration; and
    wherein the exterior surface of the seat system includes a feature that is selected from the group consisting of a tear seam, a hook and loop shut opening, and a snap-shut opening, wherein the positioning mechanism deploys through the feature.

19. An occupant restraint system for a motor vehicle having a seat system configured to provide seating to an occupant positioned adjacent to a console having a top surface and configured to provide utility, the restraint system comprising:
    a cushion stored in the folded configuration;
    wherein the cushion includes a top portion, a bottom portion and an inflatable chamber configured to inflate to provide restraint to the occupant of the vehicle;
    an inflator configured to provide gas to inflate the inflatable chamber; and
    a positioning mechanism having a first end coupled to the cushion and a second anchored end;
    wherein the bottom portion of the cushion includes at least a portion of the inflated chamber;
    wherein the bottom portion of the cushion deploys to a position below the top surface of the console, and the top portion of the cushion deploys to a position above the top surface of the console;
    wherein during occupant loading of the cushion, at least a portion of the cushion contacts the console to receive lateral support and to react forces imparted into the cushion induced by the occupant impacting the cushion; and
    wherein such lateral support impedes lateral displacement of the cushion providing additional restraint to the occupant.

20. An occupant restraint system for a motor vehicle having a seat system configured to provide seating to an occupant positioned adjacent to a console having a top surface and configured to provide utility, the restraint system comprising:
    a cushion stored in the folded configuration;
    wherein the cushion includes a bottom portion, a top portion and an inflatable chamber configured to inflate to provide restraint to the occupant of the vehicle; and
    an inflator configured to provide gas to inflate the inflatable chamber;
    wherein the bottom portion of the cushion includes a positioning mechanism;
    wherein at least a portion of the positioning mechanism is configured to deploy to a position that is below the top surface of the console;
    wherein the top surface of the cushion deploys to a position that is above the top surface of the console;
    wherein during occupant loading of the cushion, at least a portion of cushion contacts the console to receive lateral support and to react the forces imparted into the cushion induced by the occupant impacting the cushion; and
    wherein such lateral support impedes lateral displacement of the cushion providing additional restraint to the occupant.

* * * * *